US005227774A

United States Patent [19]

Benoist

[11] Patent Number: 5,227,774

[45] Date of Patent: Jul. 13, 1993

[54] SELECTIVE CALL RECEIVER INCLUDING A RIGHT ANGLE ELASTOMERIC CONTROL SWITCH

[75] Inventor: William B. Benoist, Lake Worth, Fla.

[73] Assignee: Motorola, Inc., Schaumburg, Ill.

[21] Appl. No.: 678,512

[22] Filed: Apr. 1, 1991

[51] Int. Cl.[5] .......... H04B 7/00

[52] U.S. Cl. .......... 340/825.44; 340/311.1; 340/825.47; 340/825.48; 200/511

[58] Field of Search .......... 200/264, 511, 520, 526, 200/275, 292; 340/825.44, 311.1, 825.47, 825.48; 455/348; 341/20, 21, 22

[56] References Cited

U.S. PATENT DOCUMENTS 3,983,355 9/1976 Hyodo .......... 200/511

4,704,740 11/1987 McKee et al. .......... 455/348

*Primary Examiner*—Sandra L. O'Shea

*Assistant Examiner*—Dervis Magistre

*Attorney, Agent, or Firm*—Daniel R. Collopy; William E. Koch; Philip P. Macnak

[57] ABSTRACT

A switch includes a housing (36) which retains an elastomeric actuating member (38) having an actuating portion (46) and a contact portion (37). The contact portion (37) deforms in a first direction (52) in response to a force exerted on the actuating portion (46) in a second substantially different direction (e.g. orthogonal thereto)(48). The housing (36) comprises a rigid member in contact with a side of the elastomeric actuating member (38) opposite the actuating portion (46) on which the force is exerted.

13 Claims, 2 Drawing Sheets

— PRIOR ART —

SELECTIVE CALL RECEIVER INCLUDING A RIGHT ANGLE ELASTOMERIC CONTROL SWITCH

FIELD OF THE INVENTION

This invention relates generally to selective call receivers, and more particularly, to a paging receiver including a right-angle elastomeric control switch.

BACKGROUND OF THE INVENTION

Communication systems in general, and paging systems in particular, have attained widespread use. In such paging systems, transmitted call signals are used to call selected receivers for the purpose of transmitting information from a base station to the selected receivers. Modern paging receivers have achieved multi-function capabilities through the use of microprocessors which allow the receivers to respond to information containing various combinations of tone, tone and voice, or data messages in a variety of modes. This information may be transmitted using several paging coding schemes and message formats.

Some considerations governing the successful operation of a paging receiver relate to the portability of the receiver, battery saving, available memory, radio spectrum availability, and fast response time. Equally important, however, is the availability of a variety of form factors. It is now known, for example, to incorporate selective call receivers in pen-type formats and wrist-worn formats.

The variety of form factors renders it desirable to be able to place user actuated controls on virtually any surface of the selective call receiver housing. One such control might be, for example, one which when pressed by the user, changes the mode of operation of the pager. Unfortunately, certain surfaces of the housing lie in planes which are not coplanar with the printed circuit board contained within the housing. Thus, what is needed is a reliable and inexpensive switch which is actuated by pressing a portion of the switch external to the housing in a direction parallel to the plane of the printed circuit board, but which in fact contacts the printed circuit board in a direction substantially orthogonal thereto.

SUMMARY OF THE INVENTION

One aspect of the present invention includes a switch, comprising an elastomeric actuator having an actuating portion and a contact portion. The switch further includes a retainer for retaining the elastomeric actuator, the contact portion deforming in a first direction in response to a force exerted on the actuating portion in a second, substantially different direction. The retainer comprises a rigid member in contact with a side of the elastomeric actuating means opposite the actuating portion on which the force is exerted.

Another aspect of the present invention includes a switch, comprising a deformable, elastomeric actuating member including a contact portion and a user accessible actuating portion. The switch further includes a retainer for retaining the actuating member, the contact portion deforming in a first direction in response to a force exerted on the actuating portion in a second direction substantially orthogonal to the first direction. The retainer comprises a rigid member in contact with a side of the deformable, elastomeric actuating member opposite the actuating portion on which the force is exerted.

Another aspect of the present invention includes an electronic device, comprising a housing having at least one aperture therein and a printed circuit board having a major surface within the housing and having at least a first electrical contact thereon. The electronic device further comprises a deformable, elastomeric actuating member including a deformable portion positioned proximate the first electrical contact and including a user accessible actuating portion extending through the at least one aperture. The electronic device further comprises a second electrical contact disposed on the deformable portion, the deformable portion deforming in a first direction toward the first electrical contact in response to a force exerted on the actuating portion in a second direction substantially orthogonal to the first direction. The housing comprises a rigid member in contact with a side of the deformable, elastomeric actuating member opposite the actuating portion on which the force is exerted, and the major surface of the printed circuit board lies in a plane substantially parallel to the second direction.

Another aspect of the present invention includes a selective call receiver of the type which includes electronic circuitry for receiving messages and alerting a user that a message has been received, and which further includes at least one control element accessible by a user from the exterior of the housing. The selective call receiver comprises a housing having at least one aperture therein, and a printed circuit board having a major surface and having the electronic circuitry disposed thereon and including at least a first electrical contact thereon. The selective call receiver further comprises a deformable, elastomeric actuating member including a deformable portion positioned proximate the first electrical contact and a user accessible actuating portion extending through the at least one aperture. The selective call receiver further comprises a second electrical contact disposed on the deformable portion, the deformable portion deforming in a first direction toward the first electrical contact in response to a force exerted on the actuating portion in a second direction substantially orthogonal to the first direction. The housing comprises a rigid member in contact with a side of the deformable, elastomeric actuating member opposite the actuating portion on which the force is exerted, and the major surface of the printed circuit board lies in a plane substantially parallel to the second direction.

DESCRIPTION OF THE PREFERRED EMBODIMENT

Figure 1:
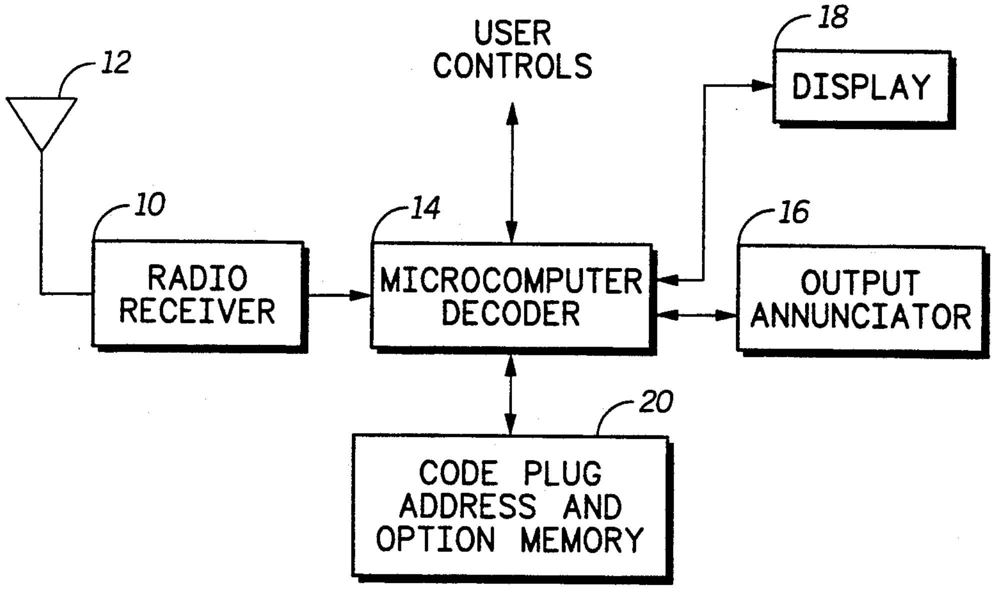
FIG. 1 is a block diagram of a paging receiver.

FIG. 1 is a block diagram of a typical paging receiver. It includes a radio receiver 10 which receives signals via antenna 12. The output of the radio receiver 10 is applied to a microcomputer decoder 14 which processes the information contained in the received signals. As can be seen, microcomputer decoder 14 communicates with output annunciator 16, display 18, code plug address and option memory 20, and the user via controls on the pager. The operation of a paging receiver of the type shown in FIG. 1 is well known and is described in U.S. Pat. No. 4,518,961 issued May 21, 1985, entitled "Universal Paging Device with Power Conservation".

Figure 2:
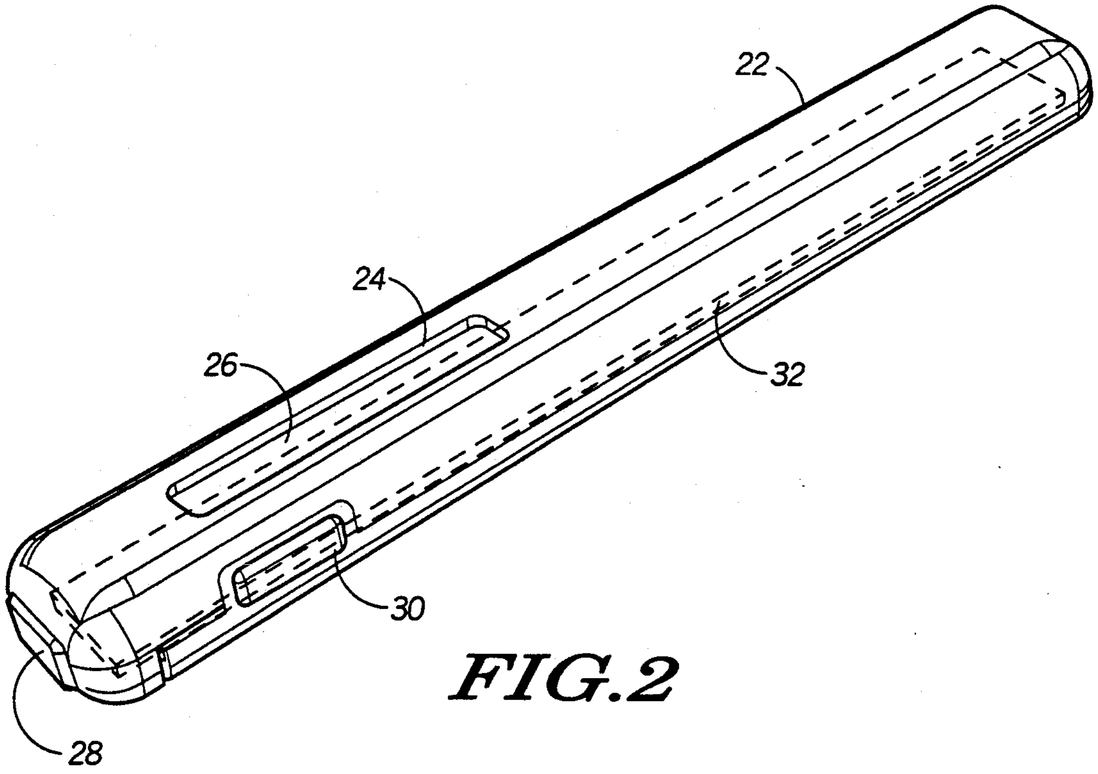
FIG. 2 is an isometric view of a paging receiver in a pen format.

FIG. 2 is an isometric view of a paging receiver constructed in a pen format. As can be seen, the pager includes a housing 22 having an aperture 24 therein through which a display 26 is visible. Additional apertures are provided in housing 22 to accommodate control buttons 28 and 30.

A printed circuit board 32 (shown in dotted lines) resides within pager housing 22 and has mounted thereon the majority of electrical circuitry required for pager operation. Printed circuit board 32 resides in a plane which is generally parallel to the plane of aperture 24. Unfortunately, the direction of movement of controls 28 and 30 are not in a direction which is normal to the major surface of printed circuit board 32 but are in fact in directions which are generally parallel to the major surface. Therefore, to be effective, these controls or switches must act on printed circuit board 32 in a right angle fashion. That is, movement of the controls in a direction parallel to the major surface of printed circuit 32 must result in action which is normal to the major surface.

Figure 3A:
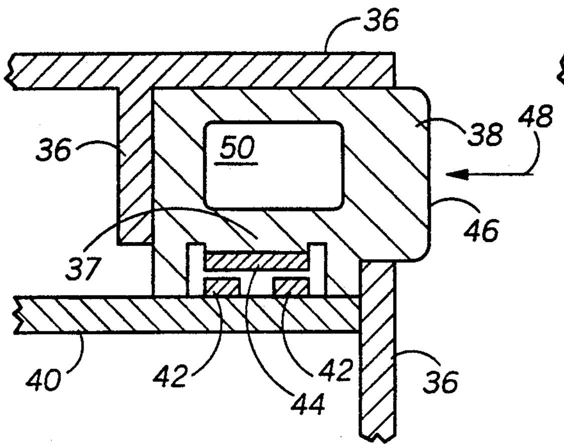
FIGS. 3A and 3B are cross-sectional views of a control switch which reacts to a force exerted thereon in a first direction by causing movement of a contact in a second direction.
Figure 3B:
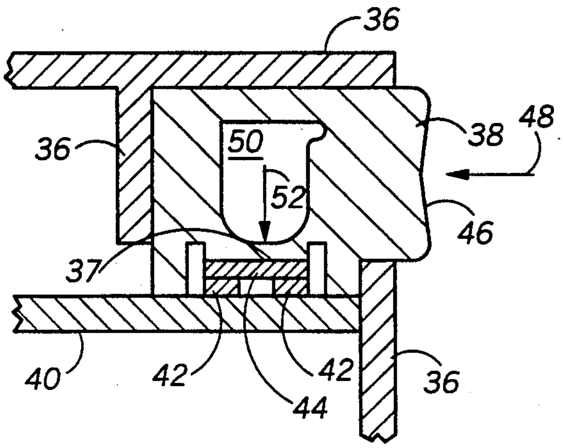

FIGS. 3A and 3B are cross-sectional views of a control switch which reacts to a force exerted thereon in a first direction by causing the movement of a contact in a second, substantially different (e.g. orthogonal) direction. Referring first to FIG. 3A, a portion of a rigid housing 36 captures a deformable elastomeric control or actuating member 38 (e.g., rubber, elastic, silicon, etc.). Elastomeric control member 38 is positioned in close proximity to a printed circuit board 40 having electrical contacts 42 disposed thereon. Electrical contacts 42 are coupled to electronic circuitry (not shown) on printed circuit board 40 in the well known manner. A second contact 44 is fixedly coupled to a lower deformable contact portion 37 of control member 38, and resides substantially directly above contacts 42. Contact 44 may, for example, be constructed from a conductive rubber, for example, carbon impregnated rubber.

The desired functionality of the device may require that contacts 42 be electrically connected from time to time. The necessity for such electrical connection is determined by and controlled by a user of the apparatus, the intent being that such electrical contact is accomplished when the user exerts a force on an exterior or user accessible actuating portion 46 of control member 38 as is indicated by arrow 48.

As can be seen, control member 38 has a cavity in the form of a rectangular tubular opening 50 therethrough. As force 48 is exerted on control member 38, the shape of rectangular opening 50 is altered. Very little change appears in the upper and leftmost walls of opening 50 due to the constraints imposed by portions of housing 36. However, the lower and rightmost surfaces of rectangular opening 50 are caused to deform, the rightmost surface extending inward and the lower surface extending downward as is indicated by arrow 52. It is the downward deflection of the lower surface which causes contact 44 to engage and electrically connect contacts 42 on printed circuit board 40, thus creating an electrical connection between their respective associated circuitry. Thus, by applying a force in the direction of arrow 48 which is substantially coplanar with the plane of the printed circuit board 40, contact 44 has been caused to move in a direction substantially orthogonal to the direction of the applied force and to the plane of printed circuit board 40 resulting in the desired electrical connection.

Figure 4A:
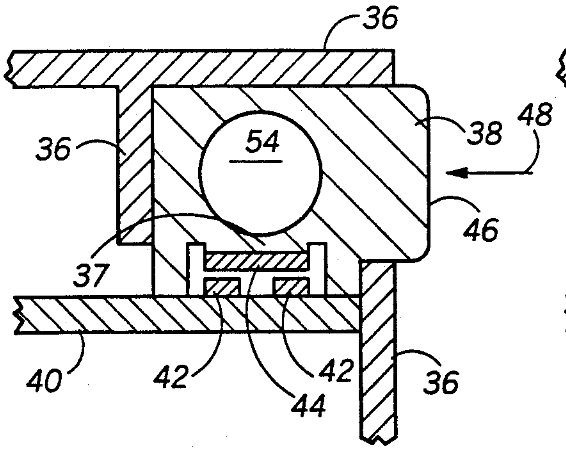
FIGS. 4A and 4B are cross-sectional views of a second embodiment of the control switch shown in FIGS. 3A and 3B.
Figure 4B:
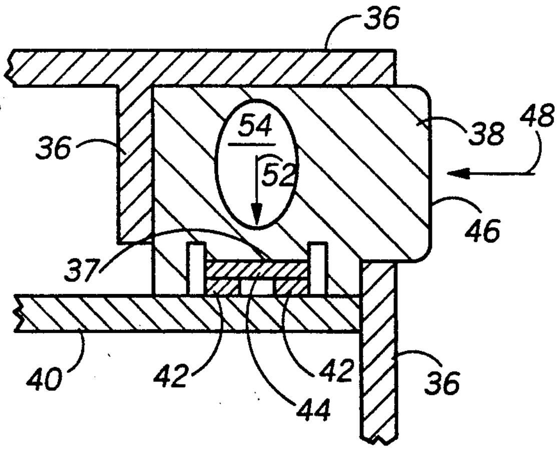

Referring to FIGS. 4A and 4B, there is illustrated a second embodiment of a new right angle switch. All elements and components are identical except that instead of a rectangular tubular opening in elastomeric control member 38, there is provided a cylindrical tubular opening 54.

As was the case previously, when the user compresses the elastomeric material by applying a force to its exterior portion 46 in a direction 48, the rightmost portion of the cylindrical surface extends inward, and the lower portion extends downward as is shown by arrow 52. Again, the required electrical connection of contacts 42 on printed circuit board 40 has been accomplished.

Thus, there has been provided a simple switch suitable for use in paging receivers and the like where it is necessary to contact a printed circuit board in a direction substantially orthogonal to the board by applying a force to the switch's control element, the force being in a place which is substantially coplanar with the plane of the printed circuit board.

What is claimed is:

1. A switch, comprising:

elastomeric actuating means having an actuating portion and a contact portion; and first means for retaining said elastomeric actuating means, said contact portion deforming in a first direction in response to a force exerted on said actuating portion in a second, substantially different direction, wherein said first means comprises a rigid member in contact with a side of said elastomeric actuating means opposite said actuating portion on which said force is exerted.

2. A switch according to claim 1 wherein said first direction and said second, substantially different direction are substantially orthogonal.

3. A switch according to claim 1 further comprising a cavity within said elastomeric actuating means to enhance the deforming of said contact portion.

4. A switch according to claim 3 wherein said cavity is a tubular opening.

5. A switch according to claim 4 wherein said tubular opening is cylindrical.

6. A switch according to claim 4 wherein said tubular opening is rectangular.

7. A switch, comprising:

a deformable, elastomeric actuating member including a contact portion and a user accessible actuating portion; and first means for retaining said actuating member, said contact portion deforming in a first direction in response to a force exerted on said actuating portion in a second direction substantially orthogonal to said first direction, wherein said first means comprises a rigid member in contact with a side of said deformable, elastomeric actuating member opposite said actuating portion on which said force is exerted.

8. A switch according to claim 7 further comprising a cavity within said deformable, elastomeric actuating member to enhance the deforming of said contact portion.

9. A switch according to claim 8 wherein said cavity is a tubular opening.

10. A switch according to claim 9 wherein said tubular opening is cylindrical.

11. A switch according to claim 9 wherein said tubular opening is rectangular.

12. An electronic device, comprising:

a housing having at least one aperture therein;

a printed circuit board having a major surface within said housing and having at least a first electrical contact thereon;

a deformable, elastomeric actuating member including a deformable portion positioned proximate said first electrical contact and including a user accessible actuating portion extending through said at least one aperture; and a second electrical contact disposed on said deformable portion, said deformable portion deforming in a first direction toward said first electrical contact in response to a force exerted on said actuating portion in a second direction substantially orthogonal to said first direction, wherein said housing comprises a rigid member in contact with a side of said deformable, elastomeric actuating member opposite said actuating portion on which said force is exerted, and wherein said major surface of said printed circuit board lies in a plane substantially parallel to said second direction.

13. A selective call receiver of the type which includes electronic circuitry for receiving messages and alerting a user that a message has been received, and which further includes at least one control element accessible by a user from the exterior of said housing, comprising:

a housing having at least one aperture therein;

a printed circuit board having a major surface and having said electronic circuitry disposed thereon and including at least a first electrical contact thereon;

a deformable, elastomeric actuating member including a deformable portion positioned proximate said first electrical contact and a user accessible actuating portion extending through said at least one aperture; and a second electrical contact disposed on said deformable portion, said deformable portion deforming in a first direction toward said first electrical contact in response to a force exerted on said actuating portion in a second direction substantially orthogonal to said first direction, wherein said housing comprises a rigid member in contact with a side of said deformable, elastomeric actuating member opposite said actuating portion on which said force is exerted, and wherein said major surface of said printed circuit board lies in a plane substantially parallel to said second direction.

* * * * *